(12) United States Patent  
Saido et al.

(10) Patent No.: US 9,359,020 B2
(45) Date of Patent: Jun. 7, 2016

(54) VEHICLE LUGGAGE COMPARTMENT STRUCTURE

(71) Applicant: HONDA MOTOR CO., LTD., Tokyo (JP)

(72) Inventors: Koji Saido, Wako (JP); Shirena Takai, Wako (JP); Hiroyuki Ohhashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/824,668

(22) Filed: Aug. 12, 2015

(65) Prior Publication Data

US 2016/0046335 A1 Feb. 18, 2016

(30) Foreign Application Priority Data

Aug. 18, 2014 (JP) ................. 2014-166175

(51) Int. Cl.
*B62D 43/10* (2006.01)
*B62D 43/00* (2006.01)
(52) U.S. Cl.
CPC ............. *B62D 43/10* (2013.01); *B62D 43/005* (2013.01)

(58) Field of Classification Search
CPC .......... B60R 5/04; B60R 5/044; B62D 25/20; B62D 25/2027; B62D 25/24; B62D 43/005; B62D 43/06; B62D 43/10
USPC ............... 296/37.2, 37.3, 37.8, 37.14, 37.16, 296/100.01, 100.02
See application file for complete search history.

(56) References Cited

U.S. PATENT DOCUMENTS 8,172,295 B2 * 5/2012 Fischer ................... B60R 5/04
296/24.43

FOREIGN PATENT DOCUMENTS

DE 10151482 A1 * 6/2003 ............... B60R 5/04
JP 3-73277 U 7/1991

* cited by examiner

*Primary Examiner* — Jason S Daniels
(74) *Attorney, Agent, or Firm* — Westerman, Hattori, Daniels & Adrian, LLP

(57) ABSTRACT

A vehicle luggage compartment structure includes a storage recess that is provided in a vehicle luggage compartment so as to store a spare tire, a lid that closes the storage recess, a rear panel that is provided so as to form a rear part of the storage recess, and a separate component that is detachably mounted substantially in the center of the rear panel on the side of the luggage compartment.

4 Claims, 7 Drawing Sheets

VEHICLE LUGGAGE COMPARTMENT STRUCTURE

CROSS REFERENCES TO RELATED APPLICATIONS

The present application claims priority under 35 U.S.C. 5119 to Japanese Patent Application No. 2014-166175, filed Aug. 18, 2014, entitled "VEHICLE LUGGAGE COMPARTMENT STRUCTURE." The contents of this application are incorporated herein by reference in their entirety.

BACKGROUND

1. Field

The present disclosure relates to a vehicle luggage compartment structure having a storage recess that stores a spare tire on a floor surface in a luggage compartment in a vehicle.

2. Description of the Related Art

Vehicles are conventionally provided with an emergency-use spare tire that is used when a fitted tire becomes punctured. Examples of such a spare tire include a temporary tire smaller than the fitted tire and a full-size tire, such as that used in foreign countries, (hereinafter referred to as "driving tire") that has the same size as the fitted tire.

For example, a vehicle spare tire board fixation structure disclosed in Japanese Unexamined Utility Model Registration Application Publication (JP-UM-A) No. 3-73277 is known as a structure that allows two types of spare tire, namely, a temporary tire and a driving tire, to be stored in a vehicle.

Such a vehicle spare tire board fixation structure stores a spare tire in a spare tire storage recess (recessed area) provided in a floor surface in a luggage compartment (trunk) and is closed off with a lid. When storing a small-sized temporary tire in the storage recess, the lid is placed on a horizontal supporting member provided above the storage recess and is supported by a vertically adjustable bracket provided above the storage recess.

In the case where a driving tire is stored in the storage recess, the driving tire is wider than the temporary tire, causing the horizontal supporting member to be raised up by the increment in width. For this reason, when luggage is placed on the front part of the lid, the rear part of the lid is raised. Such raising of the lid is prevented by holding the lid with the bracket that is moved upward and secured to the upper part of the storage recess with a winged screw.

The vehicle spare tire board fixation structure described in JP-UM-A No. 3-73277, however, has a problem in that the bracket for locating the lid at upper and lower positions is disposed at a visible position above the storage recess, which degrades the aesthetically pleasing appearance of the luggage compartment.

In addition, a winged screw is used to secure the bracket to a rear wall above the storage recess in the luggage compartment, resulting in the screw's head portion projecting from the rear wall, which raises concerns about contact of the head portion with luggage.

SUMMARY

The present application describes a vehicle luggage compartment structure that provides an aesthetically pleasing appearance when any one of a temporary tire and a driving tire is housed and stored in a storage recess with an adjustable storage space for the tires having different sizes and the storage recess is closed off with a lid.

To solve the problem described above, the vehicle luggage compartment structure is a vehicle luggage compartment structure including a storage recess that is provided in a vehicle luggage compartment so as to store a spare tire and a lid that closes the storage recess, in which a rear panel is provided so as to form an upper part in the rear of the storage recess. The rear panel has a first, main component that supports the lid in a first, upper position and a second, separate component that is detachably mounted to the main component substantially in the center of the rear panel on a side of the vehicle luggage compartment. When the separate component is mounted to the main component, it supports the lid in a second, lower position. In one embodiment, when the lid is in the first (higher) position, it provides a first (larger) storage space for a driving tire and the detachment of the separate component from the main component ensures a sufficient space for housing the driving tire therein, and when the separate component is mounted and the lid is the second (lower) position, it provides a second (smaller) storage space for a temporary tire which is typically smaller than the driving tire.

With this arrangement, the vehicle luggage compartment structure, when the spare tire is stored in the storage recess, has a rear end of the spare tire disposed substantially in the center of the rear panel in the upper part at the rear of the storage recess in plain view. When the separate component mounted substantially in the center of the rear panel on the side of the luggage compartment is removed, a space of the separate component is added to a storage space in the storage recess, allowing a larger tire to be stored. As described above, the separate component is attachable to and detachable from the rear panel and thereby can adjust a distance between the spare tire and the rear panel and perform the function of switching between the sizes of the spare tire to be stored in the storage recess. When a smaller spare tire is stored in the storage recess, the separate component is mounted on the rear panel and covers a portion on which the separate component is to be mounted, thereby providing an aesthetically pleasing appearance with no degradation in the appearance.

Preferably, the storage recess may have an upper support that supports the lid and a lower support that is disposed below the upper support so as to support the lid, in which the lid can be disposed at an upper position supported by the upper support and at a lower position supported by the lower support.

With this arrangement, by causing a support to be switched between the upper and lower supports in the storage recess, the lid can be disposed at the upper position through the upper support and at the lower position through the lower support. Accordingly, when a narrower spare tire is stored, the lid is disposed at the lower position through the lower support, which produces an additional luggage space above the storage recess, allowing more luggage to be effectively placed in the luggage. In contrast, when a wider spare tire is stored, the lid is disposed at the upper position through the upper support, which gives a space large enough to store the wider spare tire in the storage recess, enhancing the storage capability of the storage recess.

Preferably, the rear panel may have a cutout portion that is blocked by the separate component mounted substantially in the center of the rear panel on the side of the luggage compartment, rear lower supports that are formed on the right and left sides of the cutout portion, respectively, so as to support the lid, and rear upper supports that are formed at a level higher than the rear lower support on the right and left sides of the cutout portion in plain view, respectively, so as to support the lid.

With this arrangement, when a smaller spare tire is stored in the storage recess, the lid can be supported by the rear lower support of the rear panel, thereby allowing the smaller spare tire to be disposed at the lower position to fit the height (tire width) of the smaller spare tire. In contrast, when a larger spare tire is stored in the storage recess, the lid can be supported by the rear upper support of the rear panel, thereby allowing the larger spare tire to be disposed at the upper position to fit the height (tire width) of the larger spare tire. The lid, when supported by the rear upper support, covers and hides the cutout portion and the rear lower supports from above, since the rear upper support is located higher than the rear lower supports formed on the right and left sides of the cutout portion. Accordingly, the lid can make the cutout portion and the rear lower supports invisible to occupants or others, thereby improving the appearance of the storage recess. The vehicle luggage compartment structure according to the present application makes the luggage compartment aesthetically pleasing when any one of the temporary tire and the driving tire is stored in the storage recess and the storage recess is closed with the lid.

Preferably, the cutout portion may be formed so as to be depressed toward the rear of a vehicle body and so as to consist of a concave-shaped portion in plain view into which part of an outer circumference of the spare tire can be inserted.

With this arrangement, the cutout portion is formed so as to be depressed toward the rear of a vehicle body and consist of a concave-shaped portion in plain view into which part of an outer circumference of the spare tire can be inserted, which produces an additional space large enough to allow the spare tire to be moved rearward by a distance of that space, thereby allowing a larger spare tire to be stored in the storage recess.

DESCRIPTION OF THE PREFERRED EMBODIMENTS

A vehicle luggage compartment structure according to the present application is described below with reference to the attached drawings. References to directions in the description that follows are based on the front, rear, left, right, top, and bottom of a vehicle 1. A vehicle width direction is synonymous with a right-to-left/left-to-right (crosswise) direction.

[Vehicle]

Prior to description of the vehicle luggage compartment structure according to the present application, the vehicle 1 is described with reference to FIGS. 1 and 2. The vehicle 1 is a motor vehicle, such as a hatchback, wagon, van, coupe, sedan, or SUV, having a compartment for loading luggage. The vehicle 1 has a luggage compartment 2 provided in a rear section 1a of the vehicle body, a door (not illustrated) that opens and closes the luggage compartment 2, a door opening section 1b where the door is disposed so as to be openable and closable, a storage recess 3 that enables luggage to be stored in a floor surface 2b of the luggage compartment 2, and a rear panel 5 disposed at the lower part of the door opening section 1b. The vehicle 1 includes any type of vehicle that has the luggage compartment 2, the storage recess 3, and the rear panel 5.

The door opening section 1b is an opening that is opened and closed with, for example, a tailgate or a trunk lid (not illustrated) and through which luggage is put into the luggage compartment 2. The door includes any type of door that closes the door opening section 1b. The door includes a double door, a slide door, a laterally opening type hinged door, a flap type hinged door, and a trunk lid. The following descriptions use, as an example, a flap type hinged door that opens and closes the door opening section 1b of the luggage compartment 2.

[Luggage Compartment]

Figure 2:
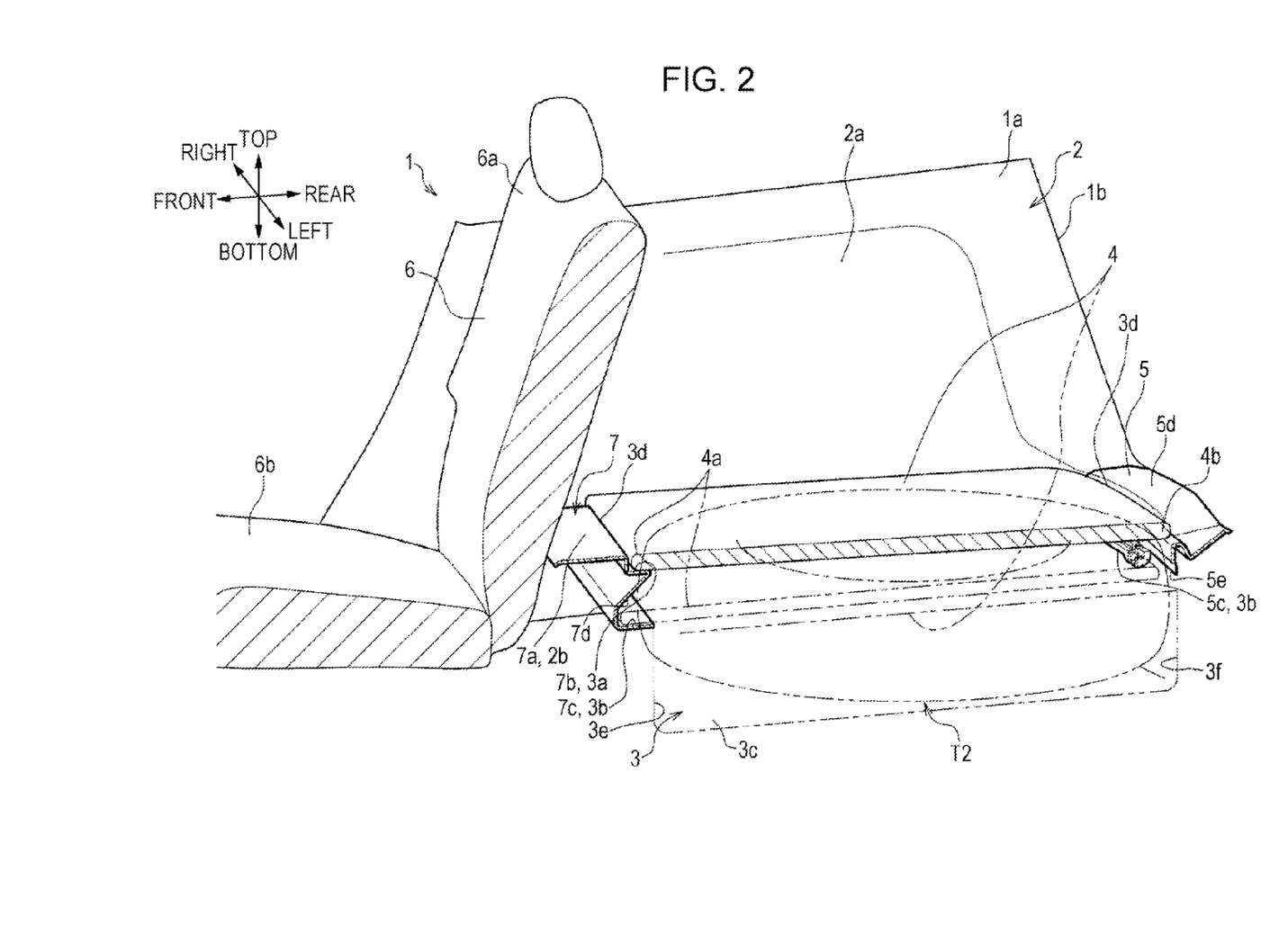
FIG. 2 is a perspective view of a luggage compartment in which a lid is disposed at an upper position in a vehicle luggage compartment structure according to an embodiment of the present application.

As shown in FIG. 2, the luggage compartment 2 is a luggage storage space in the vehicle 1 in which a spare tire T can be stored in the storage recess 3 that can be covered with a lid 4 and luggage can be placed on the lid 4. The luggage compartment 2 is disposed between, for example, a rear seat 6 and a tailgate (not illustrated). The luggage compartment 2 is provided with the rear seat 6 disposed therebefore, the tailgate (not illustrated) disposed at the door opening section 1b, luggage compartment side walls 2a provided on the right and left sides, respectively, the storage recess 3 provided in the floor surface 2b, the lid 4 that closes the storage recess 3, the rear panel 5 provided at the rear of the storage recess 3, a shelf support 7 provided in the front of the storage recess 3, and a rear floor panel 8 (see FIG. 3) provided below an inner bottom surface 3c of the storage recess 3. In order to place luggage in the luggage compartment 2, the storage recess 3 is covered with the lid 4 and luggage is placed on the lid 4.

The rear seat 6 is provided with a seat back 6a and a seat cushion 6b. The seat back 6a, when raised to an upright position, forms a partition between the luggage compartment 2 and a passenger compartment. The tailgate (not illustrated) is openable and closable, thereby allowing luggage to be put into and taken out from the luggage compartment 2. The luggage compartment side walls 2a are formed of a rear side trim that forms an inner wall of the luggage compartment 2.

[Spare Tire]

Figure 1:
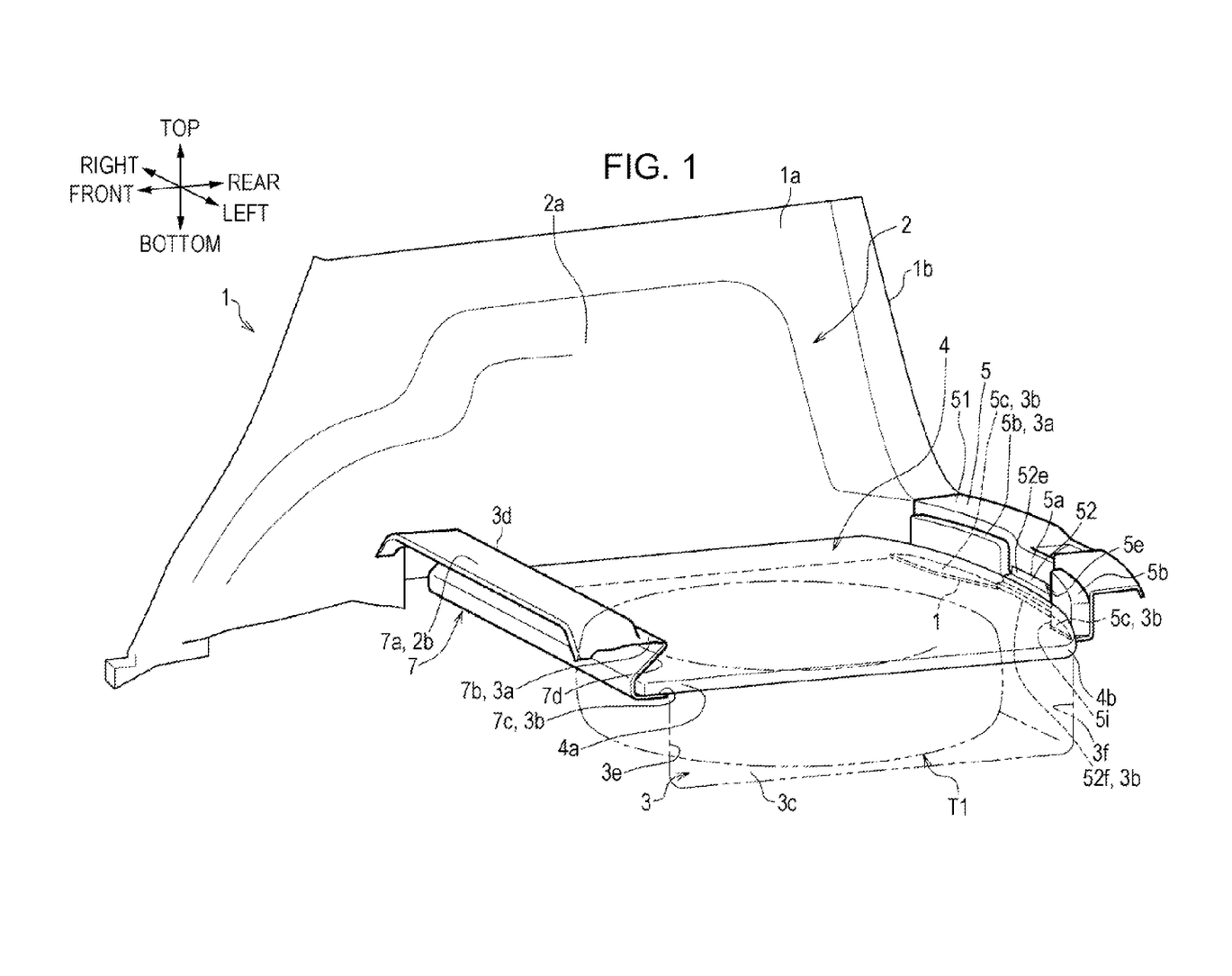
FIG. 1 is a perspective view of a luggage compartment in which a lid is disposed at a lower position in a vehicle luggage compartment structure according to an embodiment of the present application.

The spare tire T shown in FIGS. 1 and 2 is a spare tire stored in the storage recess 3 which acts as a temporary tire T1 for emergency use or a driving tire T2 of the same size as a factory-fitted tire mounted on the vehicle 1. The temporary tire T1 shown in FIG. 1 is a tire that is smaller in width and outer diameter than the driving tire T2. The driving tire T2 is a full-size tire of a standard size for use in the vehicle 1 which acts as a spare tire or a factory-fitted tire that can be removed from the vehicle 1 so that the tire may be replaced.

[Storage Recess]

As shown in FIG. 2, the storage recess 3 forms a tire storage space in which the spare tire T can be stored and is closed with the lid 4 with the spare tire T stored therein under the floor. The storage recess 3 consists of a concave-shaped space depressed downward from the floor surface 2b over a region from a front end to a rear end of the floor surface 2b in the luggage compartment 2. The storage recess 3 has an upper support 3a that supports a front or rear end (side edge) of the lid 4 at an upper position, a lower support 3b that is located below the upper support 3a and supports a front or rear end (side edge) of the lid 4 at a lower position, the inner bottom surface 3c on which the spare tire T is placed, an opening 3d that is rectangular-shaped when viewed from above, the rear panel 5 that forms a rear side of the opening 3d, and the shelf support 7 that forms a front side of the opening 3d. The storage recess 3 has a two-step structure allowing the lid 4 to be disposed at either of the upper position (a first position that defines a first, larger tire storage space underneath the lid) and the lower position (a second position that defines a second, smaller tire storage space underneath the lid).

The upper support 3a supports the lid 4 at the upper position. The upper support 3a consists of a front upper support 7b of the shelf support 7 and a rear upper support 5b of the rear panel 5.

The lower support 3b supports the lid 4 at the lower position. The lower support 3b consists of a front lower support 7c of the shelf support 7, a rear lower support 5c of the rear panel 5, and a lower support 52f of a separate component 52.

As shown in FIG. 1, when the lid 4 is located at the lower position of the storage recess 3, the temporary tire T1 for disposition in the storage recess 3 is placed on the inner bottom surface 3c. Also, as shown in FIG. 2, when the lid 4 is located at the upper position of the storage recess 3, the driving tire T2 is placed on the inner bottom surface 3c in the storage recess 3. The inner bottom surface 3c is formed of, for example, a flat bottom surface formed at a bottommost end in the storage recess 3. The inner bottom surface 3c may have an annular groove formed therein to fit the shape of the spare tire T, thereby preventing the laid-down spare tire T in place from sliding off.

The opening 3d is an opening through which the spare tire T is put into and taken out from the luggage compartment 2 and is rectangular-shaped when viewed from above. The opening 3d is defined by an edge of the storage recess 3 formed between the shelf support 7 and the rear panel 5 when viewed from the side.

As shown in FIGS. 1 and 2, a front inner wall 3e is a side wall formed in the front of the storage recess 3 and has the upper support 3a and the lower support 3b formed at an upper part thereof and has the inner bottom surface 3c formed at a lower part thereof. A rear inner wall 3f is a side wall formed in the rear of the storage recess 3 and has the rear upper support 5b and the rear lower support 5c formed at an upper part thereof.

[Lid]

Figure 3:
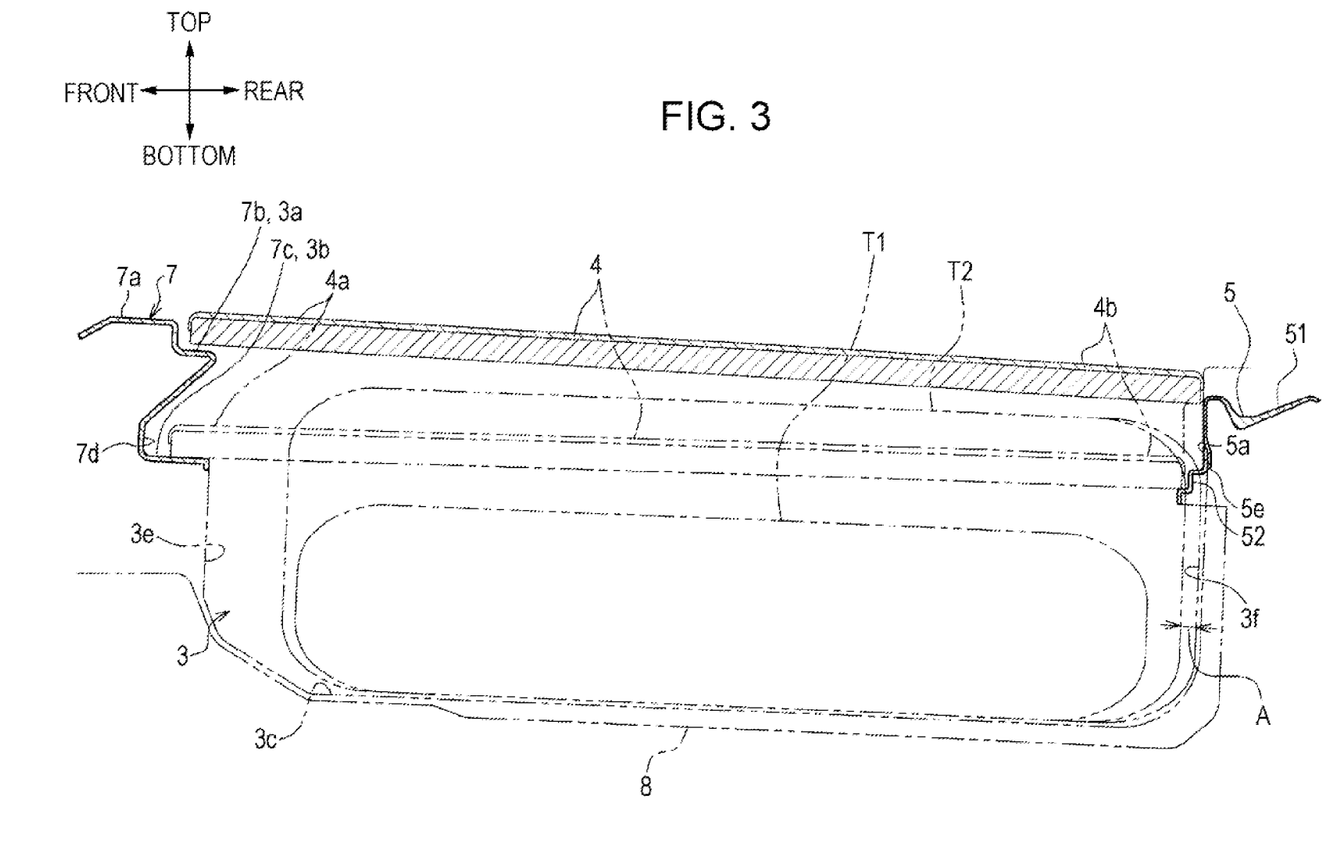
FIG. 3 is a longitudinal sectional view of a storage recess in which a lid is disposed at an upper position.

As shown in FIG. 3, the lid 4 is a flat plate member that acts as a lid for closing the storage recess 3 and as a floor panel that forms the floor surface 2b of the storage compartment 2 on which luggage is placed. The lid 4 is a member called a cargo board, a luggage board, or a floor board. The lid 4 is configured to be disposed at the upper position supported by the upper support 3a and at the lower position supported by the lower support 3b. The lid 4 has a knob formed on its upper surface at a rear end 4b thereof, with which an occupant can open and close the lid 4.

[Rear Panel]

As shown in FIG. 1, the rear panel 5 is a member that forms an upper part at the rear of the storage recess 3 and extends in the vehicle width direction along a lower part of the door opening section 1b. The rear panel 5 consists mainly of a main rear panel 51 (a first component) and the separate component 52 (a second component) that is detachably mounted on the main rear panel 51.

Figure 5:
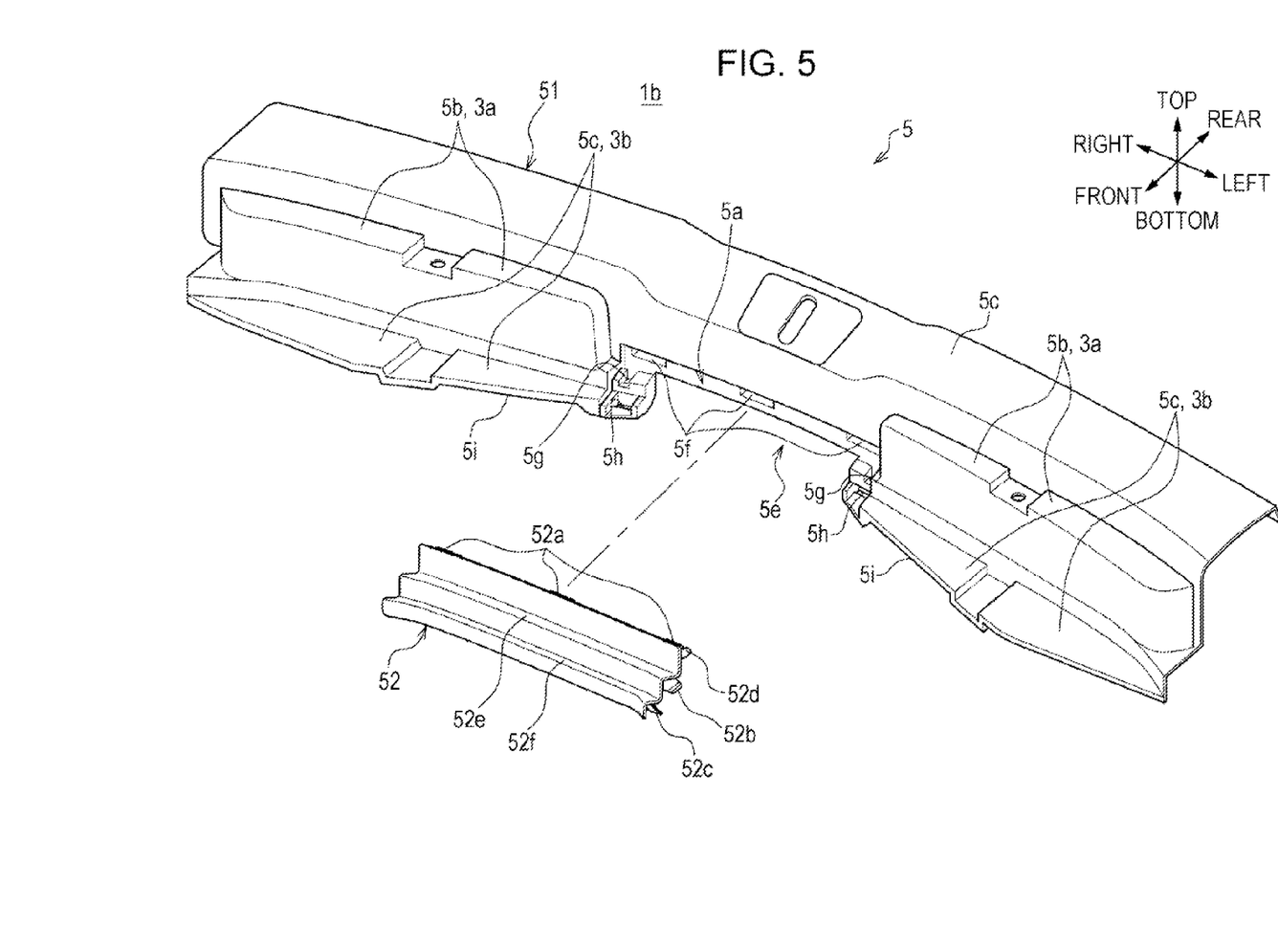
FIG. 5 is a disassembled perspective view of a rear panel.

As shown in FIG. 5, the main rear panel 51 of the rear panel 5 is a resin-made frame member that forms a lower opening edge of the door opening section 1b and extends in the vehicle width direction. The main rear panel 51 has a separate component mounting portion 5a, the rear upper support 5b, the rear lower support 5c, an upper surface 5d, a cutout portion 5e, and locking holes 5f, 5g, and 5h formed therein.

The separate component mounting portion 5a is formed substantially in the center of the rear panel 5 on the side of the luggage compartment 2 and has the separate component 52 detachably mounted thereon. The separate component mounting portion 5a, when viewed from above, is formed so as to be depressed toward the rear of the vehicle body and consists of a concave portion into which a rearward portion of an outer circumference of the laid-down spare tire T can be inserted. Also, the separate component mounting portion 5a is formed in an inverted concave shape (see FIG. 6), when viewed from front, and has the three locking holes 5f formed at an upper position and the locking holes 5g, 5h formed on each of right and left sides thereof.

As shown in FIGS. 1 and 2, the rear upper support 5b supports the rear end 4b of the lid 4 from below when the lid 4 is disposed at the upper position of the storage recess 3. The rear upper support 5b, when viewed from above, is formed in a step-like shape at each of the right and left sides of the separate component mounting portion 5a (cutout portion 5e) in the rear panel 5. With this arrangement, the right and left rear upper supports 5b have a concave-groove shape formed therebetween, when viewed from above and from the front, and have no separate component mounting portion 5a provided therebetween. The rear upper supports 5b are formed in a step-like shape at a level lower by the thickness of the lid 4 than an upper surface level of the front upper support 7b.

The rear lower support 5c supports the rear end 4b of the lid 4 when the lid 4 is disposed at the lower position of the storage recess 3. The rear lower support 5c, when viewed from above, is formed in a step-like shape at each of the right and left sides of the separate component mounting portion 5a (cutout portion 5e) so as to be located in front of the rear upper supports 5b. The rear lower support 5c is disposed on the rear inner wall 3f in the storage recess 3 at the same height as the front lower support 7c so as to oppose the front lower support 7c. As shown in FIG. 1, the right and left rear lower supports 5c have an inclined section 5i formed at a front end thereof along a rear end of the laid-down spare tire T. The inclined section 5i becomes closer to the rear of the vehicle body at a point closer to the center of the rear panel 5.

As shown in FIG. 2, the upper surface 5d of the main rear panel 51 forms a lower opening edge of the door opening section 1b and is formed in its entirety like a substantially flat plate substantially at the same height as the lid 4 disposed at the upper position. A striker (not illustrated) and a plate around the striker are provided in the middle of the upper surface 5d.

As shown in FIG. 5, the main rear panel 51 has the cutout portion 5e formed in a side wall thereof at a middle lower part close to the luggage compartment. The cutout portion 5e is formed at an inner edge of the separate component mounting portion 5a and is blocked by the separate component 52 that is mounted on the separate component mounting portion 5a. The locking holes 5f, 5g, 5h are rectangular-shaped holes which are formed in the separate component mounting portion 5a and elastic locking pieces 52a, 52b, 52c of the separate component 52 are engaged with and disengaged from, respectively.

The separate component 52 is a blocking member for blocking the cutout portion 5e that is detachably mounted on the separate component mounting portion 5a provided on the side of the luggage compartment 2 substantially in the center of the rear panel 5. The separate component 52 is a resin-made plate member having elastic locking pieces 52a, 52b, 52c, a supporting piece 52d, a step portion 52e, and a lower support 52f. The separate component 52 is attachable to and detachable from the main rear panel 51, thereby acting as an adjusting member that can adjust the distance between the spare tire T and the rear panel 5. In other words, the detachment of the separate component 52 from the separate component mounting portion 5a adds a space equivalent to the separate component 52 to the distance between the spare tire T and the rear panel 5, enabling the storage of a larger-diameter driving tire T2. In contrast, the attachment of the separate component 52 to the separate component mounting portion 5a reduces the distance between the spare tire T and the rear panel 5 by a space equivalent to the separate component 52, which is suitable for storage of the temporary tire T1 that is smaller in diameter than the driving tire T2.

Figure 7A:
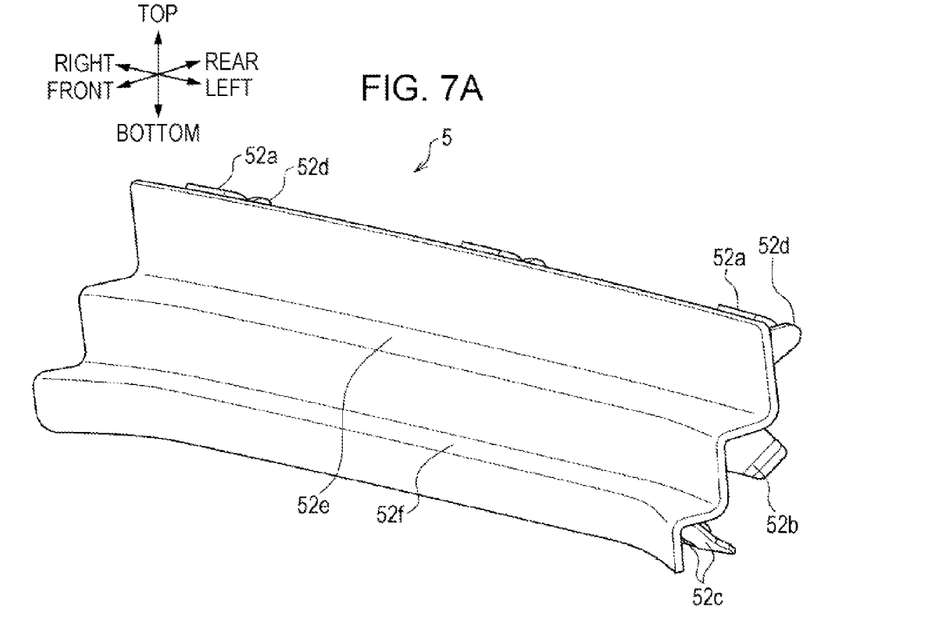
FIG. 7A is an enlarged perspective view of a separate component as viewed from front.
Figure 7B:
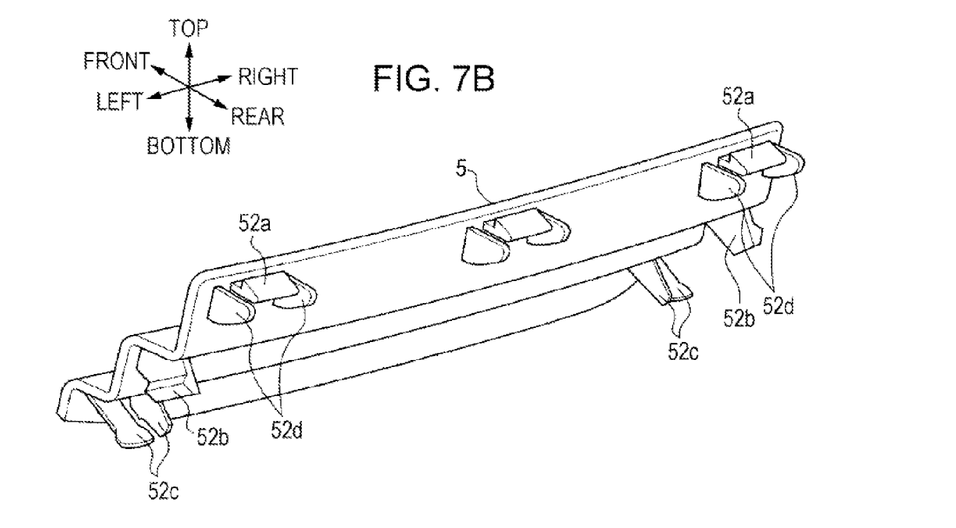
FIG. 7B is an enlarged perspective view of a separate component as viewed from rear.

As shown in FIGS. 7A and 7B, the elastic locking pieces 52a, 52b, 52c are elastic pieces having locking pawls that are locked into open edges of the locking holes 5f, 5g, 5h, respectively. The separate component 52 can be mounted on the separate component mounting portion 5a by locking the elastic locking pieces 52a, 52b, 52c into the locking holes 5f, 5g, 5h.

Figure 6:
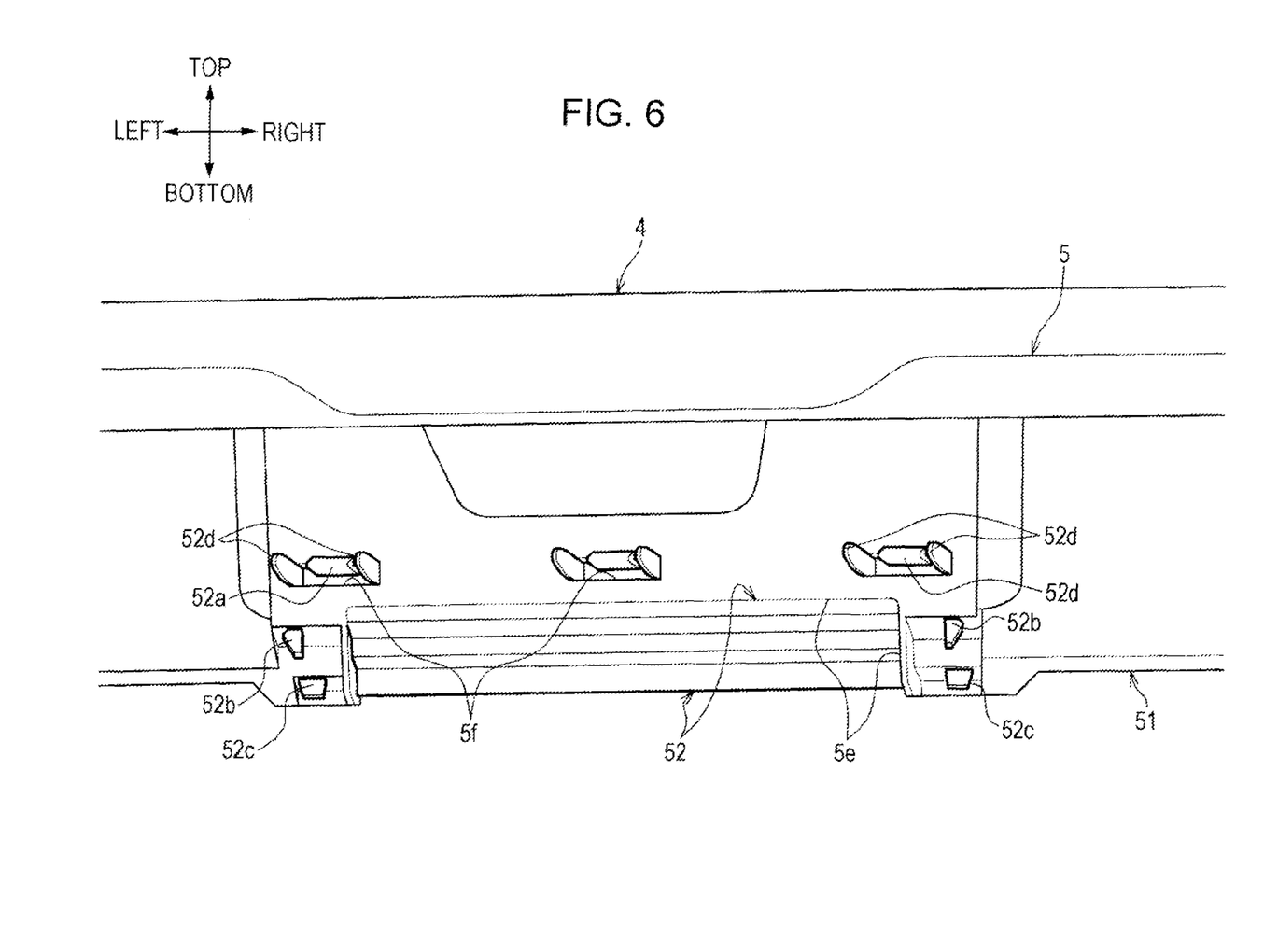
FIG. 6 is an enlarged rear view showing a center section of a rear panel as viewed from rear.

As shown in FIG. 6, the elastic locking pieces 52a are formed in the middle and on the right and left sides on the rear upper part of the separate component 52 so as to extend rearward and are locked into upper opening edges of the locking holes 5f, respectively. The elastic locking pieces 52a have supporting pieces 52d formed on the right and left sides thereof. The elastic locking pieces 52b are formed on the right and left sides of the separate component 52 and are engaged with and disengaged from the locking holes 5g (see FIG. 6). The elastic locking pieces 52c are formed on the lower right and left ends of the separate component 52 and are engaged with and disengaged from the locking holes 5h (see FIG. 6).

The step portion 52e is a step-like surface that extends in the vehicle width direction and that is in a central portion of the separate component 52 extending in the vehicle width direction. The step portion 52e is formed at a level slightly lower than an upper surface level of the lid 4 disposed at the upper position (see FIGS. 1 and 3). The step portion 52e performs the function of covering a gap between the lid 4 and the main rear panel 51 when the lid 4 is disposed at the lower position. The lower support 52f is a step-like surface extending in the vehicle width direction along the step portion 52e. The lower support 52f is formed at a level equal to the level of the rear lower support 5c and supports the lid 4 disposed at the lower position together with the right and left rear lower supports 5c (see FIGS. 1 and 4).

[Shelf Support]

As shown in FIGS. 1 and 2, the shelf support 7 is a member that forms a front edge and a front upper wall of the storage recess 3 and extends in the vehicle width direction above the front inner wall 3e of the storage recess 3. The shelf support 7 has a floor surface portion 7a formed at an uppermost level in the shelf support 7, the front upper support 7b formed below the floor surface portion 7a, the front lower support 7c formed below the front upper support 7b, and a lid insertion portion 7d that is formed in front of the front lower support 7c and is substantially horizontal-tunnel-shaped in cross-sectional view.

As shown in FIG. 2, the floor surface portion 7a is a member that forms a front outer edge of the storage recess 3 as well as part of the floor surface 2b of the luggage compartment 2. The floor surface portion 7a is a flat plate extending in the vehicle width direction. When the seat back 6a of the rear seat 6 is folded forward onto the seat cushion 6b, the floor surface portion 7a is configured to become flush with an upper surface of the seat back 6a and thereby increase the space in the luggage compartment 2.

As shown in FIG. 2, the front upper support 7b supports a front end 4a of the lid 4 when the lid 4 is disposed at the upper position in the storage recess 3. The front upper support 7b is a step-like member formed above a front end of the opening 3d and has a flat surface below the floor surface portion 7a at a front end of the luggage compartment. The front upper support 7b is formed in the shape of a number "7" when viewed from the side.

As shown in FIG. 1, the front lower support 7c supports a front end 4a of the lid 4 when the lid 4 is disposed at the lower position in the storage recess 3. The front lower support 7c is a flat step-like member formed on the front inner wall 3e so as to be located between the front upper support 7b and the inner bottom surface 3c. The front lower support 7c has the lid insertion portion 7d in the front thereof into which the front end 4a of the lid 4 is inserted whereby a rear end 4b is turned about the front end 4a to tilt up the lid 4.

[Rear Floor Panel]

A rear floor panel 8 is a flat metal plate member that forms the floor surface 2b of the rear section 1a and is provided below the inner bottom surface 3c of the storage recess 3 so as to be connected to the floor in the passenger compartment.

[Effect]

An effect of the vehicle luggage compartment structure according to the present application is described below with reference to the attached drawings.

First, the storage of the smaller temporary tire T1 in the storage recess 3 is described below. In this case, the lid 4 is released from the storage recess 3 and the separate component 52 is mounted on the separate component mounting portion 5a in the rear panel 5, as shown in FIG. 5. The separate component 52 can be mounted on the rear panel 5 in a single operation by locking the elastic locking pieces 52a, 52b, 52c and the supporting pieces 52d into the locking holes 5f, 5g, 5h. This causes the separate component 52 to cover the cutout portion 5e of the rear panel 5, thereby substantially eliminating a distance between the cutout portion 5e and the lid 4. Accordingly, the appearance is not degraded even if the cutout portion 5e is present in the rear panel 5.

Then, the temporary tire T1 shown in FIG. 1 is laid down and stored in the storage recess 3 with the lid 4 released. Since the temporary tire T1 is smaller in diameter and width than the driving tire T2 (see FIG. 2), an uppermost part of the temporary tire T1 shown in FIG. 1 is disposed below the lower support 3b.

To cover the storage recess 3 with the lid 4, the front end 4a of the lid 4 is inserted into the lid insertion portion 7d and placed on the front lower support 7c. Then, the rear end 4b of the lid 4 is placed on the rear lower support 5c, resulting in the lid 4 being successfully disposed at the lower position in the storage recess 3. This process completes the closure of the storage recess 3.

As described above, the lid 4 is disposed at the lower position in the storage recess 3 shown in FIG. 1. When the lid 4 is disposed at the lower position, an upper part of the separate component mounting portion 5a is disposed above the lid 4 and is visible to an occupant, but the separate component 52 blocks the separate component mounting portion 5a and the cutout portion 5e, thereby preventing the degradation of the appearance. The lid 4, when disposed at the lower position, produces an additional space arising from being positioned at the lower position, resulting in an expanded storage space above the lid 4 in the luggage compartment 2 which enables more luggage to be put on the lid 4.

Next, the storage of the driving tire T2 in the storage recess 3 is described below. In this case, the lid 4 is released from the storage recess 3 and the separate component 52 is removed from the separate component mounting portion 5a in the rear panel 5, as shown in FIG. 5. The removal of the separate portion 52 from the separate component mounting portion 5a in the rear panel 5 on the side of the luggage compartment leads to a creation of an additional space equivalent to the thickness of the separate component 52 due to the absence of the separate component 52 and the rear upper support 5b, resulting in a cut-out or depressed portion created in the rear panel 5 on the side of the luggage compartment 2.

To store in the storage recess 3 a spare driving tire T2 or a driving tire T2 to be replaced by the temporary tire T1 taken out from the vehicle 1, the driving tire T2 shown in FIG. 2 is laid down and placed in the storage recess 3 with the lid 4 released. Being larger in diameter and width than the temporary tire T1, the driving tire T2 is disposed at a level slightly lower than the upper support 3a.

Figure 4:
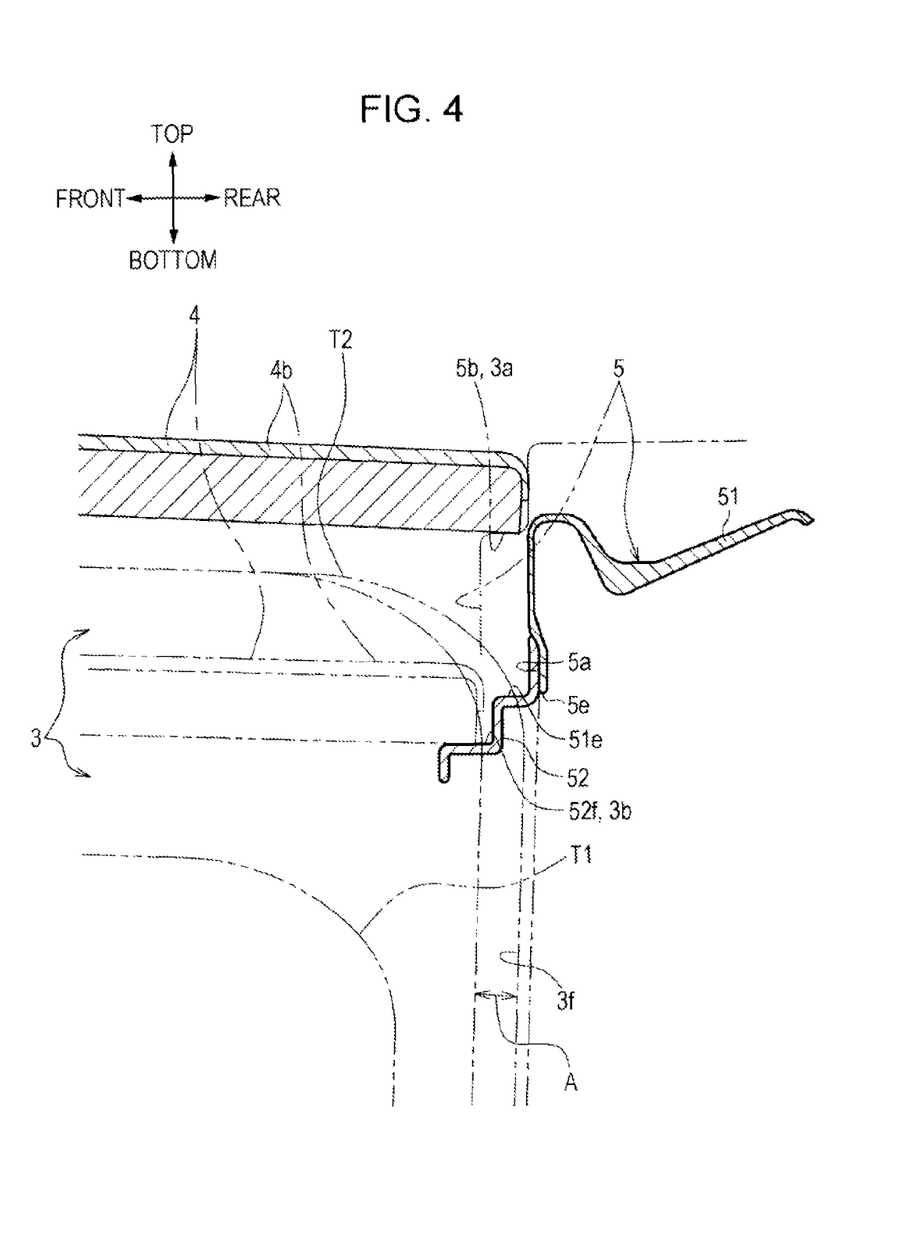
FIG. 4 is a longitudinal sectional view of a rear end of a storage recess in which a lid is disposed at an upper position.

As shown in FIGS. 3 and 4, when the driving tire T2 is put into the storage recess 3, the rear panel 5 has the cutout portion 5e or a depression extending rearward in plain view due to the removal of the separate component 52 mounted in the rear panel 5. This arrangement produces an additional space between the spare tire T and the rear panel 5, allowing the storage of the driving tire T2 larger than the temporary tire T1. Accordingly, the driving tire T2 can be put into and taken out from the storage recess 3 with its rear end inserted into the separate component mounting portion 5a and the cutout portion 5e which provide an open space.

Consequently, when the driving tire T2 is stored, the separate component mounting portion 5a and the cutout portion 5e provide room for housing part of the driving tire T2, allowing the storage of a larger spare tire T in the storage recess 3. When the driving tire T2 is taken out from the storage recess 3, there is longitudinal margins in the cutout portion 5e into which the rear end of the driving tire T2 can be inserted. This allows the driving tire T2 to be moved rearward by the distance equivalent to a longitudinal length of the separate component 52, thereby allowing the tire to be tilted or moved backward and forward. With this arrangement, the driving tire T2 can be easily put into or taken out from the storage recess 3.

As shown in FIG. 2, when the driving tire T2 is placed in the storage recess 3 and the lid 4 is disposed at the upper position, the separate component mounting portion 5a and the cutout portion 5e are located below the lid 4 and is hidden by the lid 4, making the appearance of the rear panel 5 aesthetically pleasing.

The lid 4 disposed at the upper position has the front end 4a placed at the front upper support 7b and has the rear end 4b placed at the rear upper support 5b (see FIG. 5). As a result, the lid 4 is horizontally disposed so as to be substantially flush with the floor surface portion 7a and the upper surface 5d of the rear panel 5. Due to the lid 4 being flush with the upper surface 5d of the rear panel 5, luggage placed on the lid 4 needs not be raised high above the lid 4 from the floor surface 2b in the luggage compartment 2 in order to be unloaded, allowing luggage to be more easily loaded into and unloaded from the luggage compartment 2.

As described above, the vehicle luggage compartment structure according to the present application, when a larger driving tire T2 is put into the storage recess 3 in the luggage compartment 2, can adjust a distance between the spare tire T and the rear panel 5 and a longitudinal space in the storage recess 3 by detaching the separate component 52 detachably mounted on the rear panel 5 depending on the size of the spare tire T. With this arrangement, the spare tire T for storage in the storage recess 3, whether being a smaller temporary tire T1 or a driving tire T2 larger than the temporary tire T1, can be accommodated without any modification to the rear panel 5.

[Modification]

Needless to say, the present application is typically described with reference to, but not limited to, the foregoing embodiment. Various modifications are conceivable within the scope of the present application.

The vehicle 1 is a wagon type vehicle as an example in the foregoing embodiment, but, needless to say, a sedan type vehicle fitted with a trunk can be used.

The lid 4 is not limited to a resin-made lid, but may be a lid made of metal, wood, or combined metal and wood. Also, the lid 4 is not limited to a flat plate-like member, but may be any member that can be placed on the upper support 3a and the lower support 3b. For example, the lid 4 may have a surface, a recess, and a projection that fit the shape of luggage to be placed on the lid 4.

What is claimed is:

1. A vehicle luggage compartment structure provided with a tire storage space in a vehicle, comprising:
    a storage recess in which a spare tire is to be housed;
    a lid that closes the storage recess; and
    a rear panel that defines an upper, rear part of the storage recess, the rear panel comprising:
        a first component that supports the lid in a first position that defines a first storage space in the storage recess; and
        a second component that is detachably mounted to the rear panel substantially at a center of the rear panel on a side of the vehicle luggage compartment, the second component supporting the lid in a second position that defines a second storage space in the storage recess when the second component is mounted to the first component of the rear panel, the first storage space being larger than the second storage space.

2. The vehicle luggage compartment structure according to claim 1,
    wherein the storage recess has an upper support that supports the lid in an upper position as the first position and a lower support that is disposed below the upper support so as to support the lid in a lower position as the second position which is lower than the upper position.

3. The vehicle luggage compartment structure according to claim 2,
    wherein the rear panel has a longitudinal direction and comprises,
        a cutout portion formed substantially in a center in the longitudinal direction on the side of the luggage compartment and configured to mount thereto the second component,
        rear lower supports that are formed on a right and left sides of the cutout portion along the longitudinal direction, respectively, so as to support the lid in the second position, and
        rear upper supports that are formed on the right and left sides of the cutout portion along the longitudinal direction, respectively, so as to support the lid in the first position.

4. The vehicle luggage compartment structure according to claim 3,
    wherein the cutout portion is formed so as to be recessed toward a rear side of a vehicle body, which forms an inwardly concaved portion that allows part of an outer circumference of the spare tire to be housed.

* * * * *